United States Patent [19]

Hakamada

[11] Patent Number: 5,272,320

[45] Date of Patent: Dec. 21, 1993

[54] TELEPHONE CARD HAVING CALENDAR AND SYSTEM FOR ISSUING AND USING SAME

[76] Inventor: Ikuhiro Hakamada, 3 Dormitory 2101, 527 Imazato, Susono City, Shizuoka Prefecture, Japan

[21] Appl. No.: 5,862

[22] Filed: Jan. 13, 1993

Related U.S. Application Data

[63] Continuation of Ser. No. 732,204, Jul. 18, 1991, abandoned.

[30] Foreign Application Priority Data

Oct. 27, 1990 [JP] Japan .................. 2-290001
Nov. 26, 1990 [JP] Japan .................. 2-322096

[51] Int. Cl.⁵ ........................................ G06K 5/00
[52] U.S. Cl. ........................ 235/380; 235/381; 235/492
[58] Field of Search ............... 235/380, 381, 492; 283/2; 379/57, 91

[56] References Cited

U.S. PATENT DOCUMENTS

| 163,520 | 5/1975 | Hetersohn | 283/2 |
| 3,464,200 | 9/1969 | Merrick | 283/2 |
| 4,973,828 | 11/1990 | Naruse | 235/492 |

FOREIGN PATENT DOCUMENTS 62-137467 8/1987 Japan .
63-78458 5/1988 Japan .

OTHER PUBLICATIONS

U.S. Ser. No. 08/005,862 filed Jan. 13, 1993 entitled "Telephone Card Having Calendar and System for Issuing and Using Same" which is a File Wrapper Continuation of U.S. Ser. No. 07/732,204 filed Jul. 18, 1991, now abandoned.
U.S. Ser. No. 08/050,129 filed Mar. 18, 1993 entitled "System for Using Telephone Cards".

*Primary Examiner*—Harold Pitts
*Attorney, Agent, or Firm*—Howson & Howson

[57] ABSTRACT

A telephone card system comprises a telephone debit card having a continuous portion of a calendar printed on one or both sides. Additional information pertaining to a specific date or to a specific period can be provided on the card in addition to the calendar information. An automatic vending machine for the telephone card requires the customer to enter selections from two groups of choices, for example a selection from a group of telephone card values, and from a group of calendar periods. The public telephone with which the card is used is provided with a window through which the calendar information and other information can be viewed while the card is in place in the card reader associated with the telephone.

14 Claims, 15 Drawing Sheets

| 1 | | | | | | |
|---|---|---|---|---|---|---|
| Sun.|Mon.|Tue.|Wed.|Thu.|Fri.|Sat. |
| | 1 | 2 | 3 | 4 | 5 | 6 | 7 |

Sun. Mon. Tue. Wed. Thu. Fri. Sat.
  1  2  3  4  5  6  7
  8  9 10 11 12 13 14
 15 16 17 18 19 20 21
 22 23 24 25 26 27 28
 29 30 31 ... ... ... ...

2

Sun. Mon. Tue. Wed. Thu. Fri. Sat.
           1  2  3  4
  5  6  7  8  9 10 11
 12 13 14 15 16 17 18
 19 20 21 22 23 24 25
 26 27 28 ... ... ... ...

1
Mon. Tue. Wed. Thu. Fri. Sat. Sun.
 1  2  3  4  5  6  7
 8  9 10 11 12 13 14
15 16 17 18 19 20 21
22 23 24 25 26 27 28
29 30 31

2
Mon. Tue. Wed. Thu. Fri. Sat. Sun.
            1  2  3  4
 5  6  7  8  9 10 11
12 13 14 15 16 17 18
19 20 21 22 23 24 25
26 27 28

3
Mon. Tue. Wed. Thu. Fri. Sat. Sun.
            1  2  3  4
 5  6  7  8  9 10 11
12 13 14 15 16 17 18
19 20 21 22 23 24 25
26 27 28 29 30 31

4
Mon. Tue. Wed. Thu. Fri. Sat. Sun.
                     1
 2  3  4  5  6  7  8
 9 10 11 12 13 14 15
16 17 18 19 20 21 22
23 24 25 26 27 28 29
30

5
Mon. Tue. Wed. Thu. Fri. Sat. Sun.
    1  2  3  4  5  6
 7  8  9 10 11 12 13
14 15 16 17 18 19 20
21 22 23 24 25 26 27
28 29 30 31

6
Mon. Tue. Wed. Thu. Fri. Sat. Sun.
            1  2  3
 4  5  6  7  8  9 10
11 12 13 14 15 16 17
18 19 20 21 22 23 24
25 26 27 28 29 30

7
Mon. Tue. Wed. Thu. Fri. Sat. Sun.
                     1
 2  3  4  5  6  7  8
 9 10 11 12 13 14 15
16 17 18 19 20 21 22
23 24 25 26 27 28 29
30 31

8
Mon. Tue. Wed. Thu. Fri. Sat. Sun.
        1  2  3  4  5
 6  7  8  9 10 11 12
13 14 15 16 17 18 19
20 21 22 23 24 25 26
27 28 29 30 31

9
Mon. Tue. Wed. Thu. Fri. Sat. Sun.
                  1  2
 3  4  5  6  7  8  9
10 11 12 13 14 15 16
17 18 19 20 21 22 23
24 25 26 27 28 29 30

10
Mon. Tue. Wed. Thu. Fri. Sat. Sun.
 1  2  3  4  5  6  7
 8  9 10 11 12 13 14
15 16 17 18 19 20 21
22 23 24 25 26 27 28
29 30 31

11
Mon. Tue. Wed. Thu. Fri. Sat. Sun.
            1  2  3  4
 5  6  7  8  9 10 11
12 13 14 15 16 17 18
19 20 21 22 23 24 25
26 27 28 29 30

12
Mon. Tue. Wed. Thu. Fri. Sat. Sun.
                  1  2
 3  4  5  6  7  8  9
10 11 12 13 14 15 16
17 18 19 20 21 22 23
24 25 26 27 28 29 30
31

For exclusive use of
Birthday '63. 3. 30.

'90

| Sun. | Mon. | Tue. | Wed. | Thu. | Fri. | Sat. |
|------|------|------|------|------|------|------|
|      |      | 1    | 2    | 3    | 4    | 5    | 6 |
| 7    | 8    | 9    | 10   | 11   | 12   | 13   |
| 14   | 15   | 16   | 17   | 18   | 19   | 20   |
| 21   | 22   | 23   | 24   | 25   | 26   | 27   |
| 28   | 29   | 30   | 31   |      |      |      |

FIG. 5

For exclusive use of birthday date of
3. 30

IN

January
'90

| Sun. | Mon. | Tue. | Wed. | Thu. | Fri. | Sat. |
|---|---|---|---|---|---|---|
|  | 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 |  |  |  |

January

For exclusive use of Aquarius

1st, 3rd --- very dangerous

22nd ---- very fine.

0
1
5
10
30
50
100
105

'90.

Sun. Mon. Tue. Wed. Thu. Fri. Sat.
       1  2  3  4  5  6
7  8  9 10 11 12 13
14 15 16 17 18 19 20
21 22 23 24 25 26 27
28 29 30 31

FIG. 7

For exclusive use of

Mercury in Buddhism

IN

1st, 7th ····· north direction is good!

January

'90.

| Sun. | Mon. | Tue. | Wed. | Thu. | Fri. | Sat. |
|------|------|------|------|------|------|------|
|      | 1    | 2    | 3    | 4    | 5    | 6    |
| 7    | 8    | 9    | 10   | 11   | 12   | 13   |
| 14   | 15   | 16   | 17   | 18   | 19   | 20   |
| 21   | 22   | 23   | 24   | 25   | 26   | 27   |
| 28   | 29   | 30   | 31   |      |      |      |

|           | 1,000 yen | 2,000 yen | 3,000 yen |
|-----------|-----------|-----------|-----------|
| Aqarius   |           |           |           |
| Pisces    |           |           |           |
| Aries     |           |           |           |
| Taurus    |           |           |           |
| Gemini    |           |           |           |
| Cancer    |           |           |           |
| Leo       |           |           |           |
| Virgo     |           |           |           |
| Libra     |           |           |           |
| Scorpio   |           |           |           |
| Sagitarius|           |           |           |
| Capricorn |           |           |           |

TELEPHONE CARD HAVING CALENDAR AND SYSTEM FOR ISSUING AND USING SAME

This is a continuation of application Ser. No. 07/732,204, filed on Jul. 18, 1991, now abandoned.

BRIEF SUMMARY OF THE INVENTION

This invention relates to telephone cards and to systems for issuing and utilizing the same. A telephone card is a debit card, typically issued by an automatic vending machine. A money value is recorded on the card, by magnetic, mechanical or other means, at the time the card is delivered by the vending machine, and appropriate amounts are automatically deducted, from the value recorded on the card, by the public telephone apparatus in which the card is used to pay for a telephone call. Telephone cards have recently been introduced in Japan and have gone into widespread use there. They are expected to come into use in the United States in the near future, as they eliminate the need for collection of coins from the telephones.

Various forms of printed matter, for example scenic pictures or advertising, are printed on the telephone cards currently in use in Japan.

In general, a telephone card is formed of a hard, flexible plastics material. Unfortunately, when the conventional telephone card is exhausted, i.e. when its monetary value has been reduced to zero, it no longer has any value to its user. Consequently, it has been found that users have a tendency to drop exhausted cards on the ground or floor in the vicinity of a public telephone, so that the cards tend to contribute to the problem of "litter".

The principal object of this invention is to provide a telephone card and a telephone card vending and utilizing system, which reduce the above-mentioned littering problem.

The invention addresses the problem by providing the card with additional utility to the user, so that, even after the monetary value recorded on the card has been reduced to zero, the card is still useful to the holder. More specifically, the telephone card has a continuous part of a calendar printed on it on one or both sides.

In addition, the card may carry additional printed information specific to a particular date or to a particular time period within the period corresponding to the continuous portion of a calendar printed on the card.

The vending machine for issuing the telephone card is preferably provided with a plurality of push-buttons enabling the customer to select, from a group of choices, the length of the calendar portion to appear on the telephone card to be issued. In addition, the vending machine can be provided with buttons enabling the customer to select a particular monetary value for the card from a group of choices. If the vending machine provides for selection of calendar length, price and the like from two or more groups of choices, it is preferably designed to require selections to be made from each group of choices before it issues the telephone card. Furthermore, if, after entry of any choice other than the last choice, there is a delay exceeding a predetermined time interval before a next choice is entered, the previous choices are cancelled automatically and the machine is reset.

In accordance with a preferred embodiment of the invention, a telephone card filing book is provided adjacent to a public telephone so that the calendars on exhausted telephone cards can be made available to others for use as calendars.

The telephone card in accordance with the invention preferably carries a printed arrow or similar direction indicator showing the user the direction for insertion of the card into the reader slot of a public telephone equipped to be used with the card. The calendar portion printed on the card is preferably oriented so that the direction from bottom to top of the calendar portion is the same as the direction indicated by the arrow. Human-readable information is also preferably printed on the card to show the remaining monetary value of the card. This information is preferably oriented in the same direction as the calendar information.

In the preferred form of the invention, a public telephone has a reader for receiving the telephone card and for reading the machine-readable information on thereon. This reader includes a display window for exhibiting the human-readable continuous portion of a calendar on the card to the user of the card while the card is located in the card-receiving and reading means.

Various additional objects, advantages and details of the invention will be apparent from the following detailed description, when read in conjunction with the accompanying drawings.

BRIEF DESCRIPTION OF THE DRAWINGS

FIG. 2 is an elevational view of a telephone card filing book;

FIGS. 4-8 are elevational views showing five further embodiments of the telephone card;

DETAILED DESCRIPTION

Figure 1:
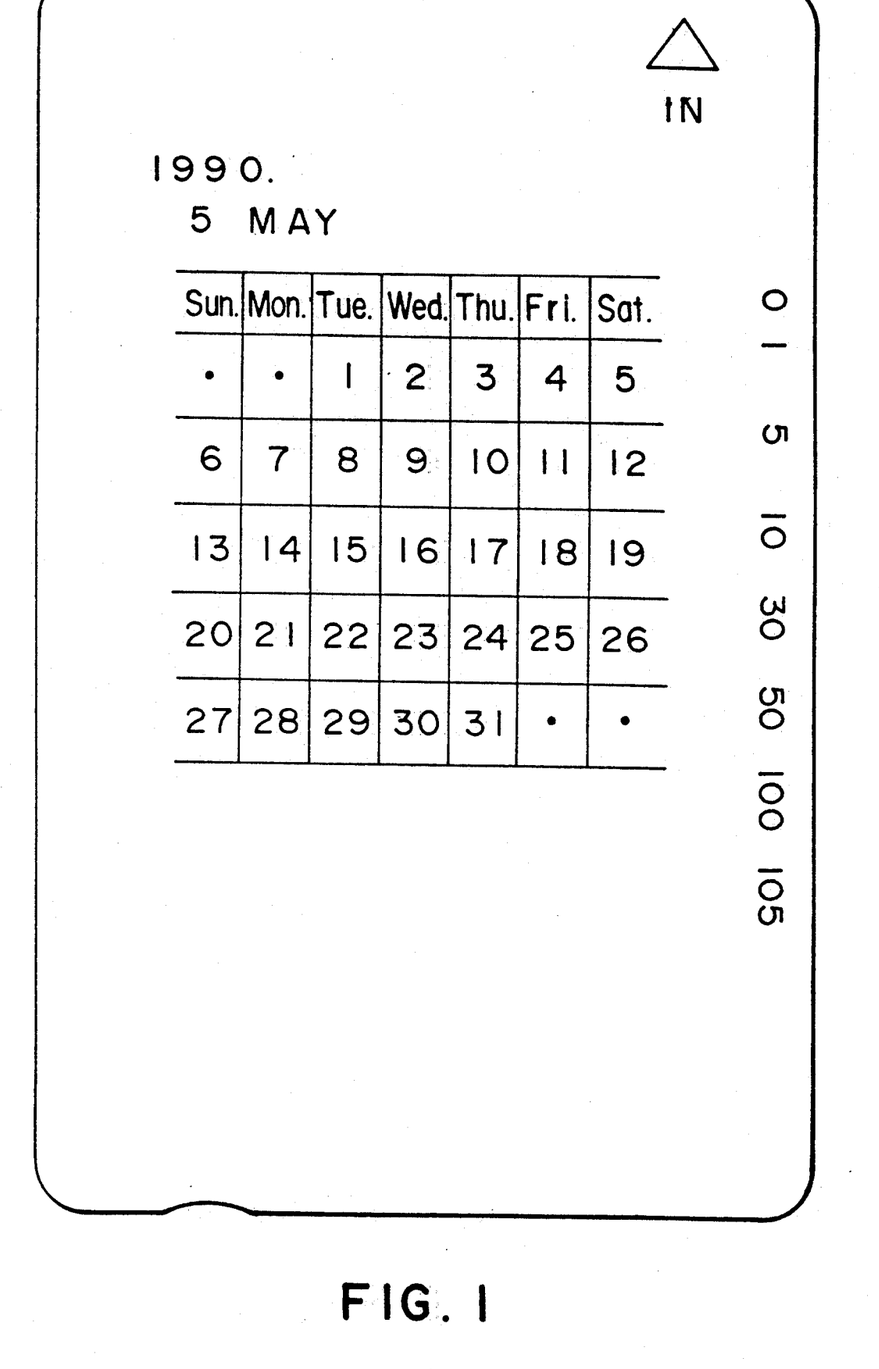
FIG. 1 is an elevational view showing a first embodiment of a telephone card in accordance with the invention.

The telephone card of FIG. 1 is a typical telephone card in accordance with the invention. It is made of a hard, flexible plastics material, and has a machine-readable magnetic strip (not shown) on which the monetary value of the card is recorded in the conventional manner. The value recorded on the magnetic strip is modified by the reading apparatus of the public telephone as the card is used, so that appropriate amounts are deducted from the value of the card as it is used to place telephone calls.

An arrow, indicating the direction of insertion of the card into the card-reading slot of a public telephone, is printed on the card. Also, numbers are printed along one edge of the card to indicate the value of the card. When the card is used, the public telephone apparatus punches a hole through, or adjacent to, one of the numbers on the card, thereby providing the user with a visual indication of the value remaining on the card.

A single month of a calendar, in this case the month of May, 1990, is also printed on one side of the card. This makes the telephone card more useful to the user. For example, when the user is making a telephone call, he often needs calendar information beforehand. With calendar information printed on the telephone card itself, it is possible for the user to refer to it immediately before placing the telephone call, without the need to search for a separate calendar.

Even after the telephone card is exhausted, i.e. when its monetary value is reduced to zero, it is still useful as a calendar, and is therefore less likely to be thrown away.

As shown in FIG. 2, the card can be inserted in a transparent pocket 1 of a telephone card file 2 which, in this case, has twelve pockets, one for each month of the calendar year. In this way, telephone cards, whether or not exhausted, can be collected and used to form a one-year calendar.

Various portions of a calendar period can be printed on the telephone card. For example, two months in the year 1990 are printed on the telephone card shown in FIG. 3. The full calendar year 1990 is printed on the telephone card shown in FIG. 4. In general, with a longer calendar period printed on the card, the card is more useful to the user. However, in some cases shorter calendar periods may be desired because they are easier to read, and can be printed in larger type.

In the embodiments of FIGS. 5-8, in addition to a part of a calendar, the telephone card has printed on it information based on a specific date or on a specific time period corresponding to a part of the calendar period printed on the card.

Figure 5:
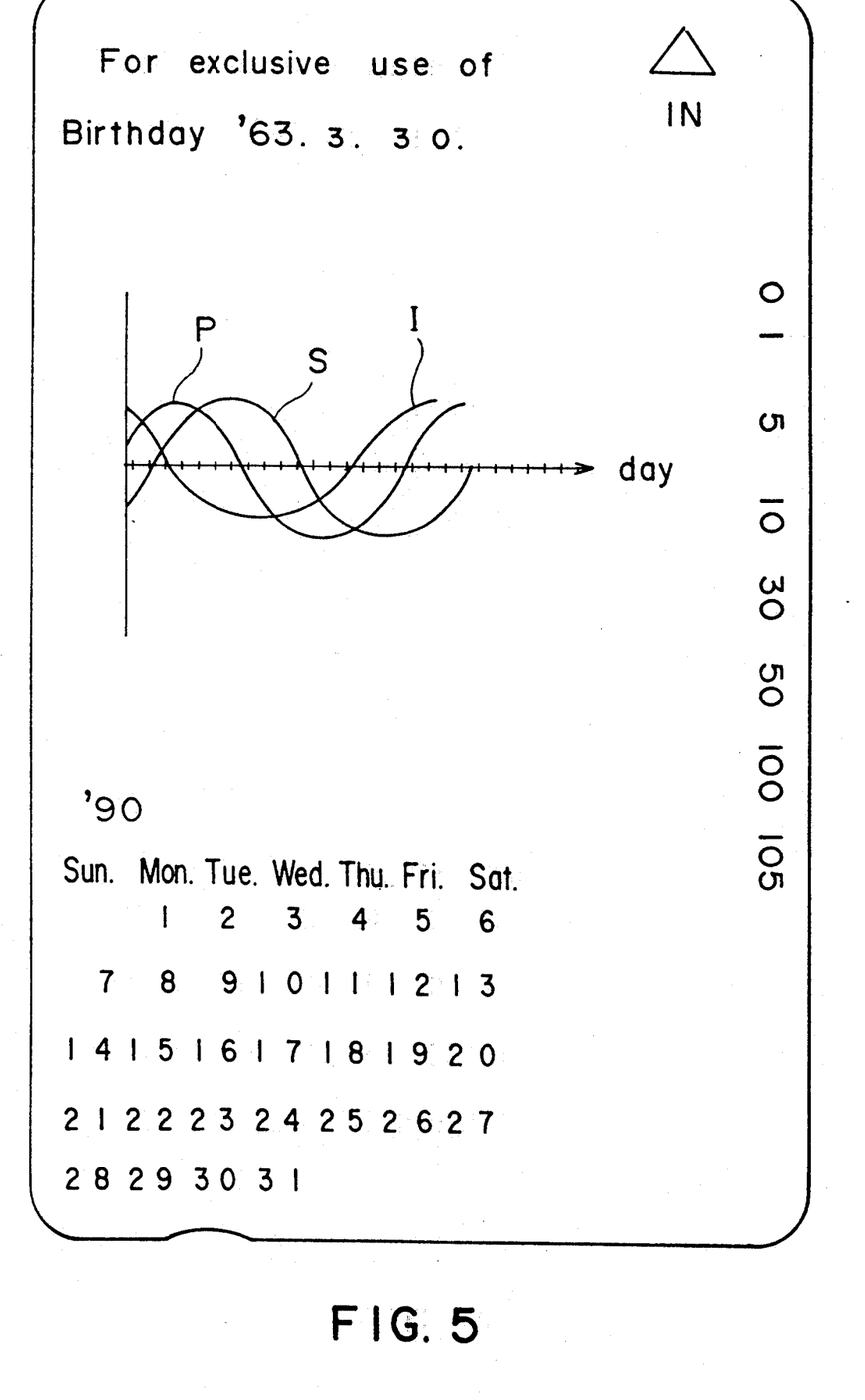

For example, in the telephone card shown in FIG. 5, the month of May, 1990 is shown as a calendar, while a biorhythm graph for the month of May, 1990 is also printed on the telephone card for a specific birth date, Mar. 30, 1963. The three rhythms, physical (P), sensory (S) and Intellectual (I), have 23, 28 and 33 day periods respectively, which are charted on the graph. The biorhythm information is intended to enable the card holder to live more efficiently by selecting certain times for his various different activities. Thus, the telephone card shown in FIG. 5 is specifically useful to a person whose birth date is Mar. 30, 1963. This date can be selected by the user of the telephone card vending machine, and the date and biorhythm information printed on the card in the process of issuing the same, by a conventional computer-controlled printer.

The telephone card of FIG. 5 is useful as a calendar and as a resource for biorhythm information before, during, and after its use as a conventional telephone card.

Figure 6:
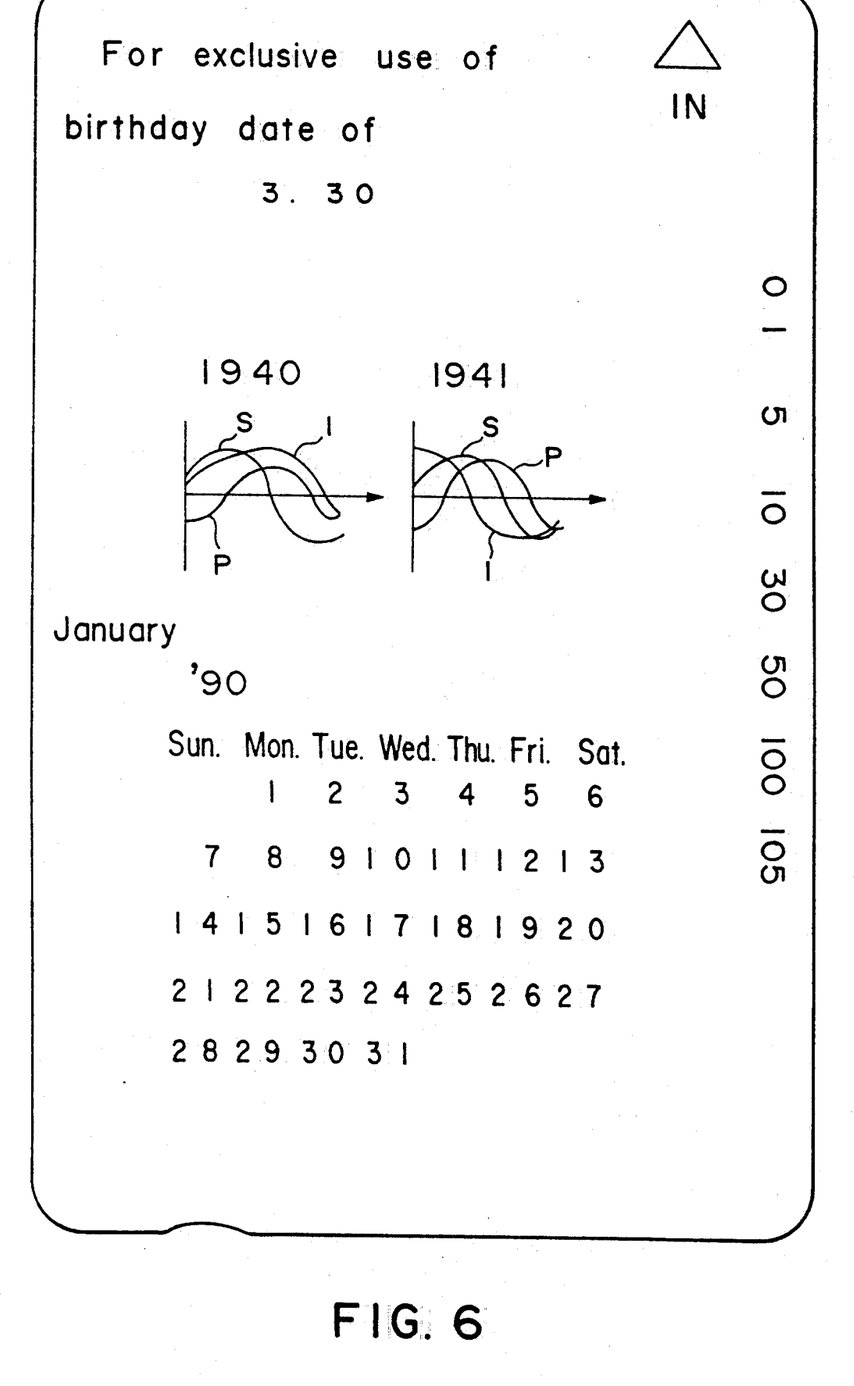

The telephone card of FIG. 6 is also a biorhythm card, but differs from the card of FIG. 5 in that it carries biorhythm information for a specific day and month for several years, in this case the years 1940 and 1941. The user need only select a specific day and month to obtain a telephone card containing biorhythm information for that day and month in several calendar years.

Figure 7:
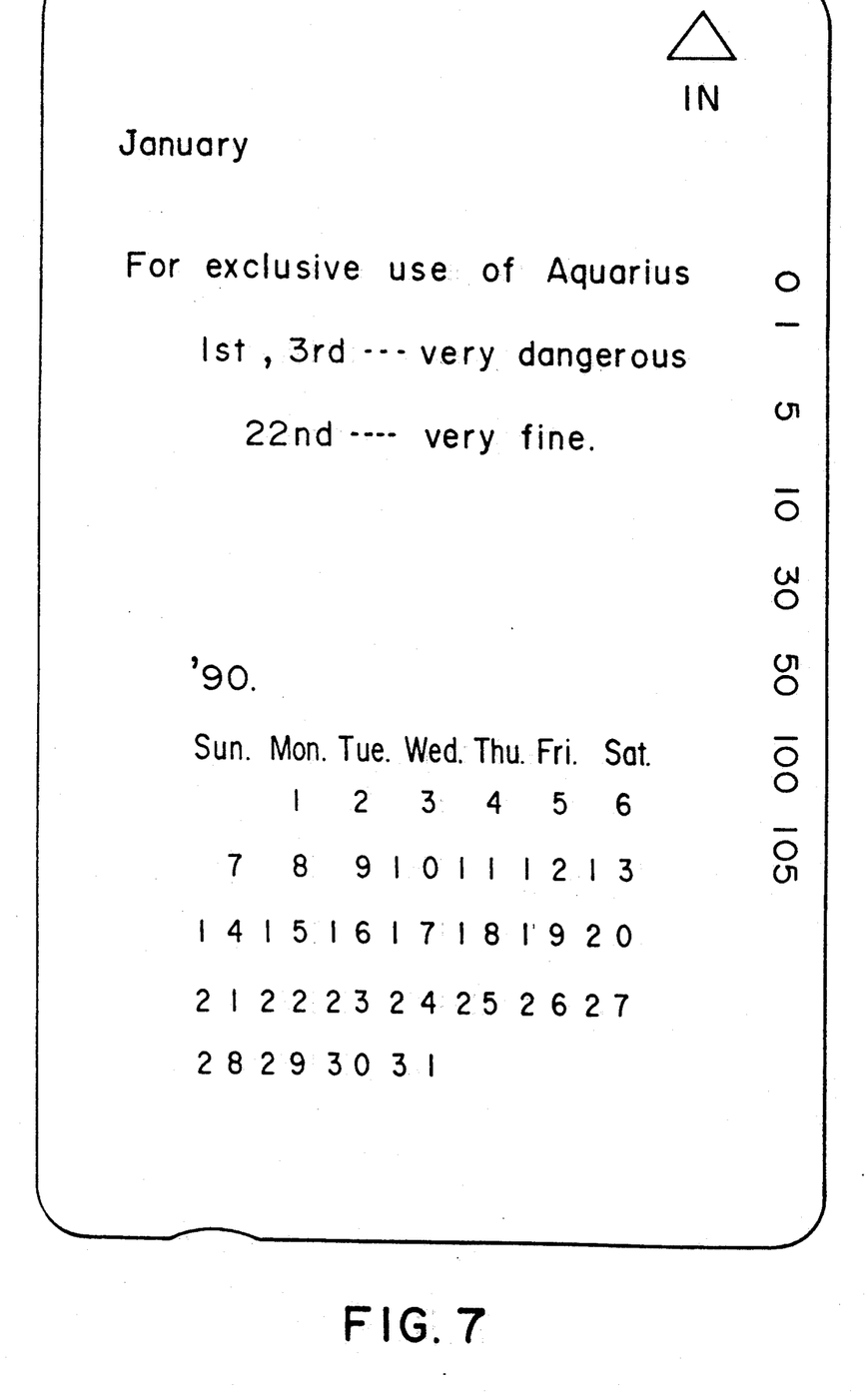

The telephone card of FIG. 7 carries a calendar for the month of January, 1990, and also carries horoscope information for an individual whose birth sign is the constellation Aquarius.

Figure 8:
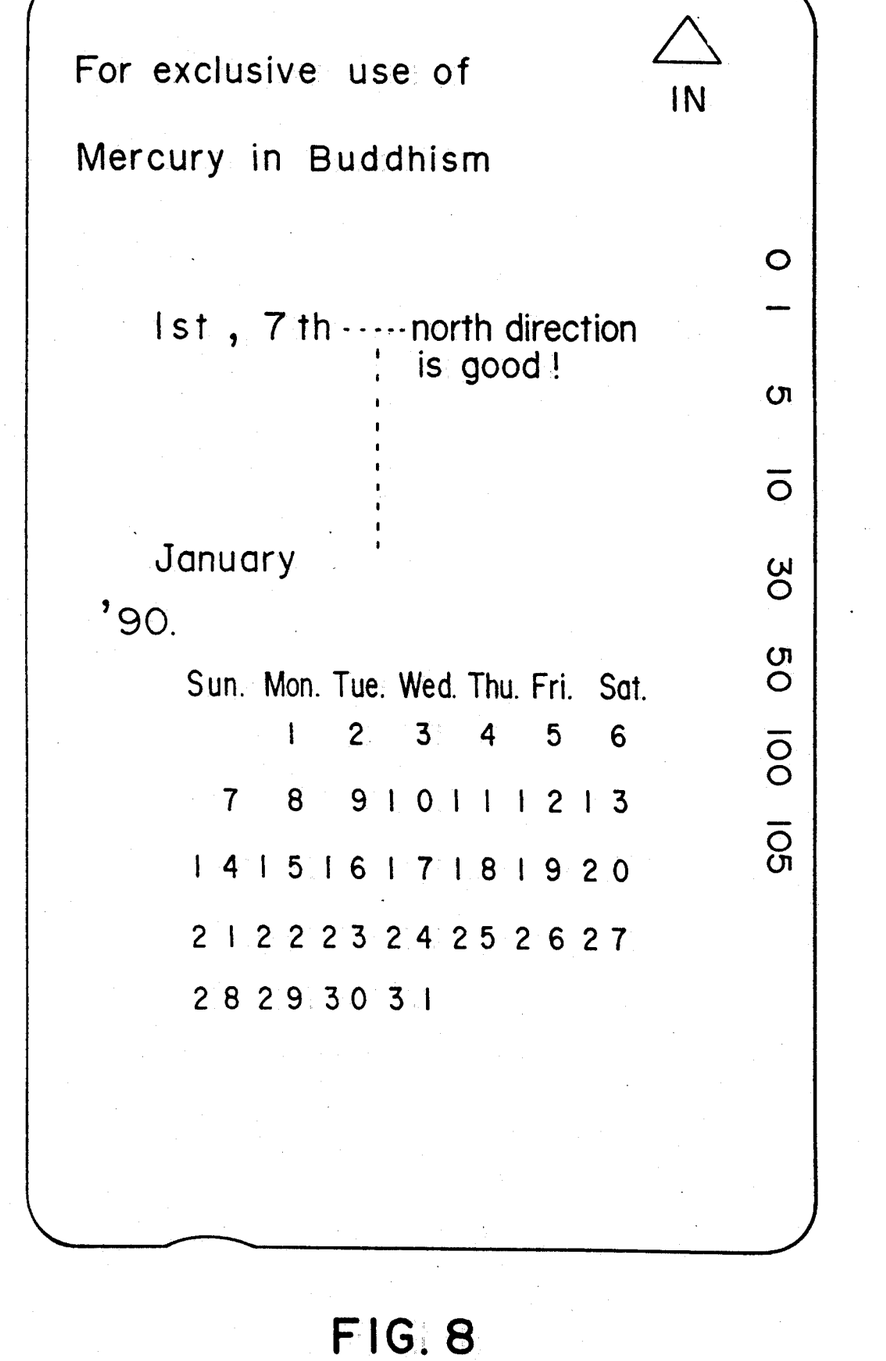

FIG. 8 shows a telephone card carrying a calendar for the month of January 1990 and also information for use in tetra-style fortune telling. In the case of the card in FIG. 8 the tetra information is for the planet Mercury in the month of January.

Figure 3:
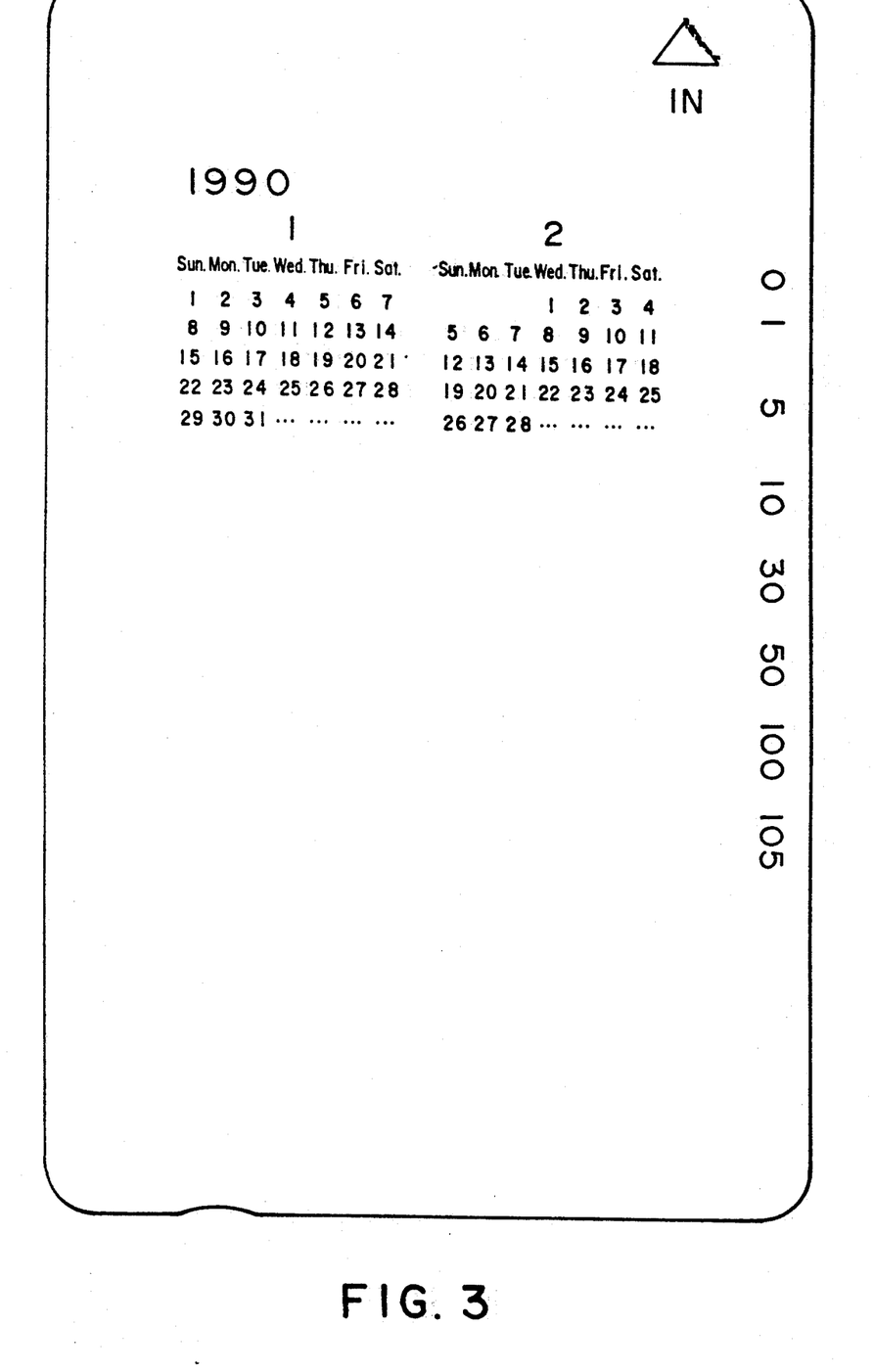
Figure 9:
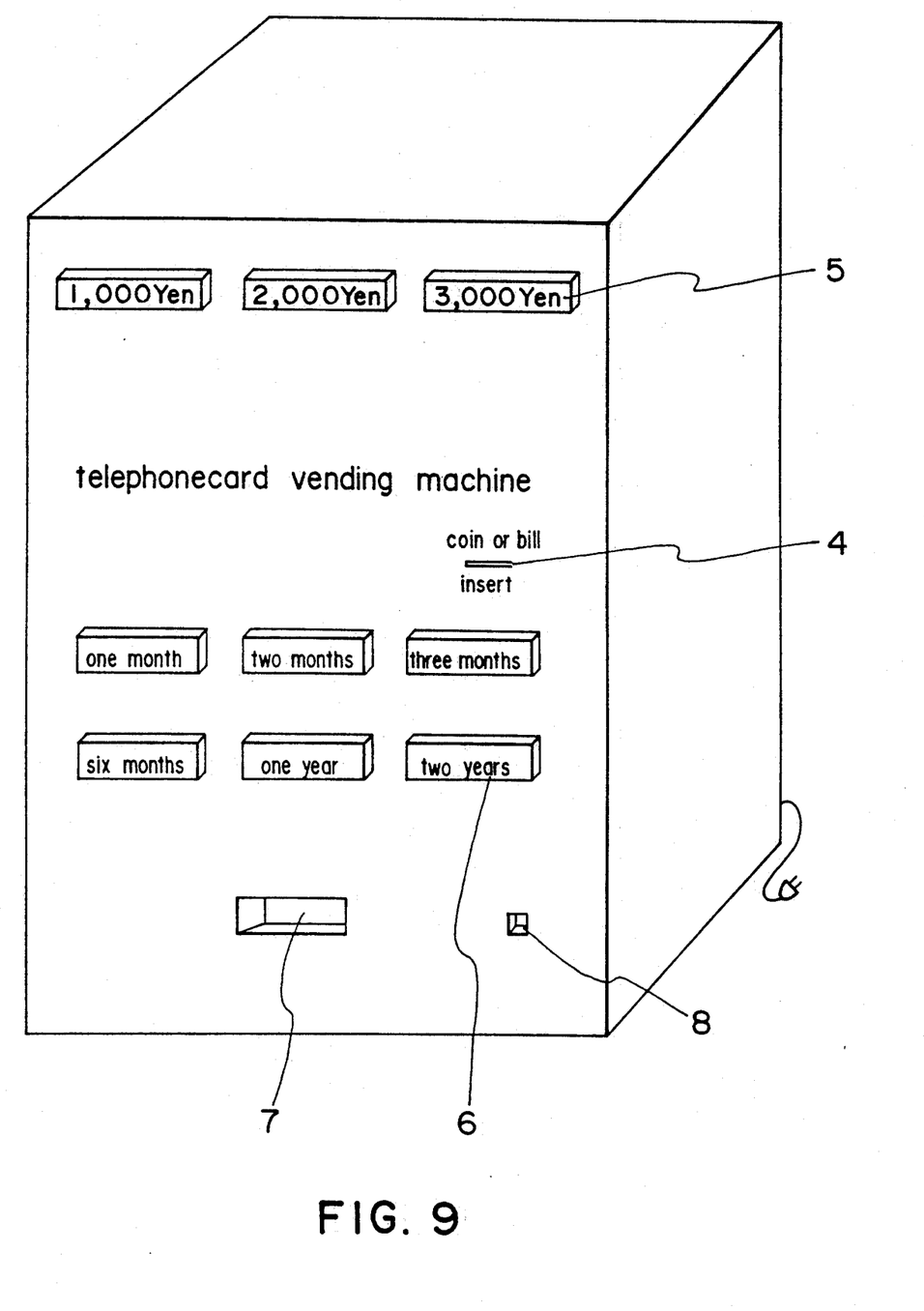
FIG. 9 is a perspective view showing an automatic vending machine for issuing a telephone card in accordance with the invention.

FIG. 9 shows a form of vending machine for issuing a telephone card of the kind shown in FIGS. 1, 3 and 4. A slot 4 is provided for insertion of currency. Buttons 5, in the uppermost row are used for selecting the value of the telephone card to be issued by the machine, and the buttons 6 in the second and third rows are used to select the calendar period which is to appear on the card to be issued. For example, depression of the button labelled "one month" will result in the issuance of a card corresponding to FIG. 1; depression of the button labelled "two months" will result in the issuance of a card corresponding to FIG. 3; and depression of the button labelled "one year" will result in the issuance of a card corresponding to FIG. 4.

The card is issued through opening 7, and a change return opening is provided at 8.

Figure 10:
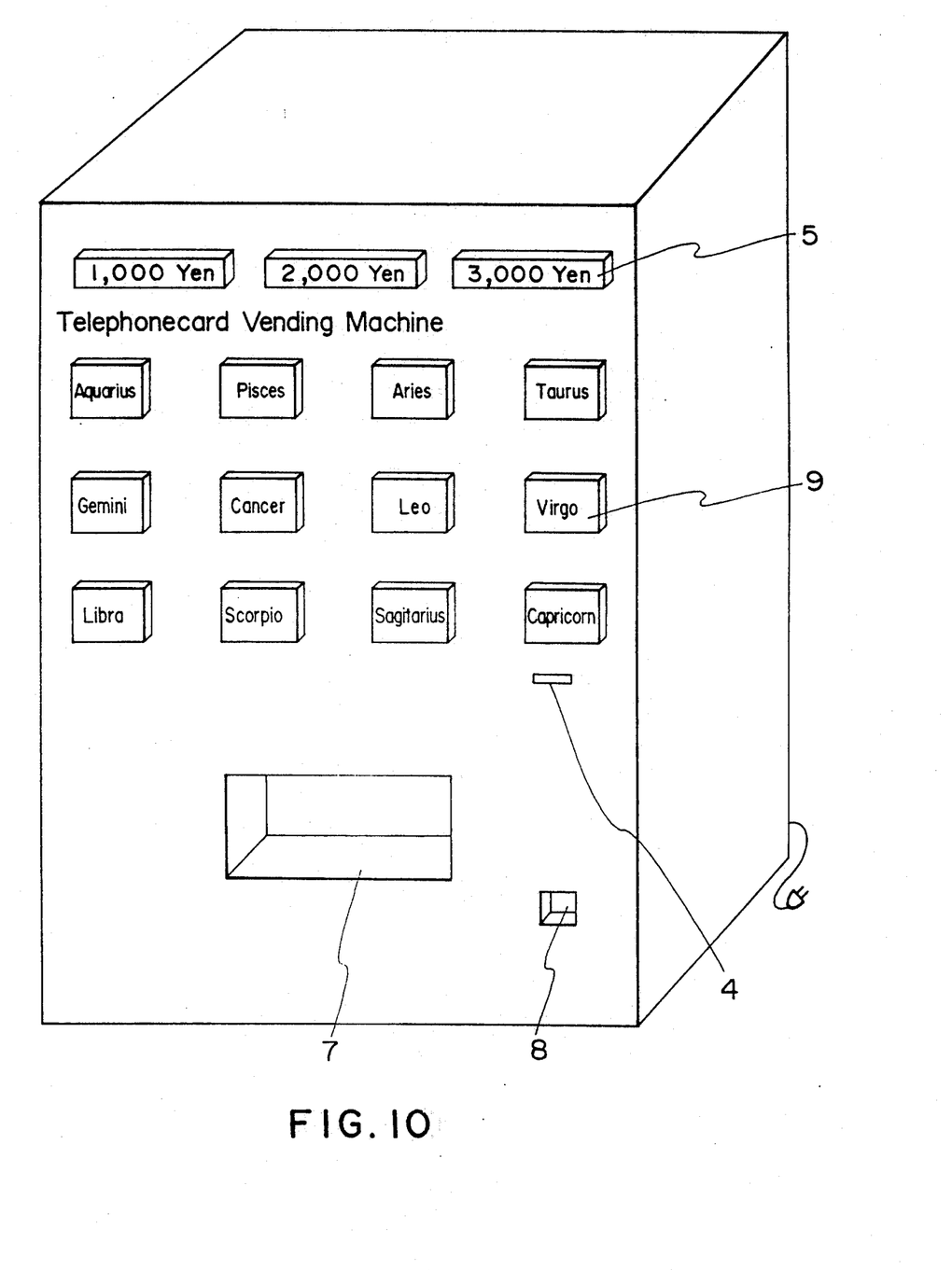
FIG. 10 is a perspective view showing another form of automatic vending machine, for issuing a telephone card such as the one shown in FIG. 7.

FIG. 10 shows another form of vending machine useful for issuing telephone cards of the kind shown in FIG. 7. The value of the telephone card is selected by depressing a button 5 in the uppermost row, while an astronomical sign corresponding to the user's birth date is entered by depressing one of twelve buttons 9.

Figure 11:
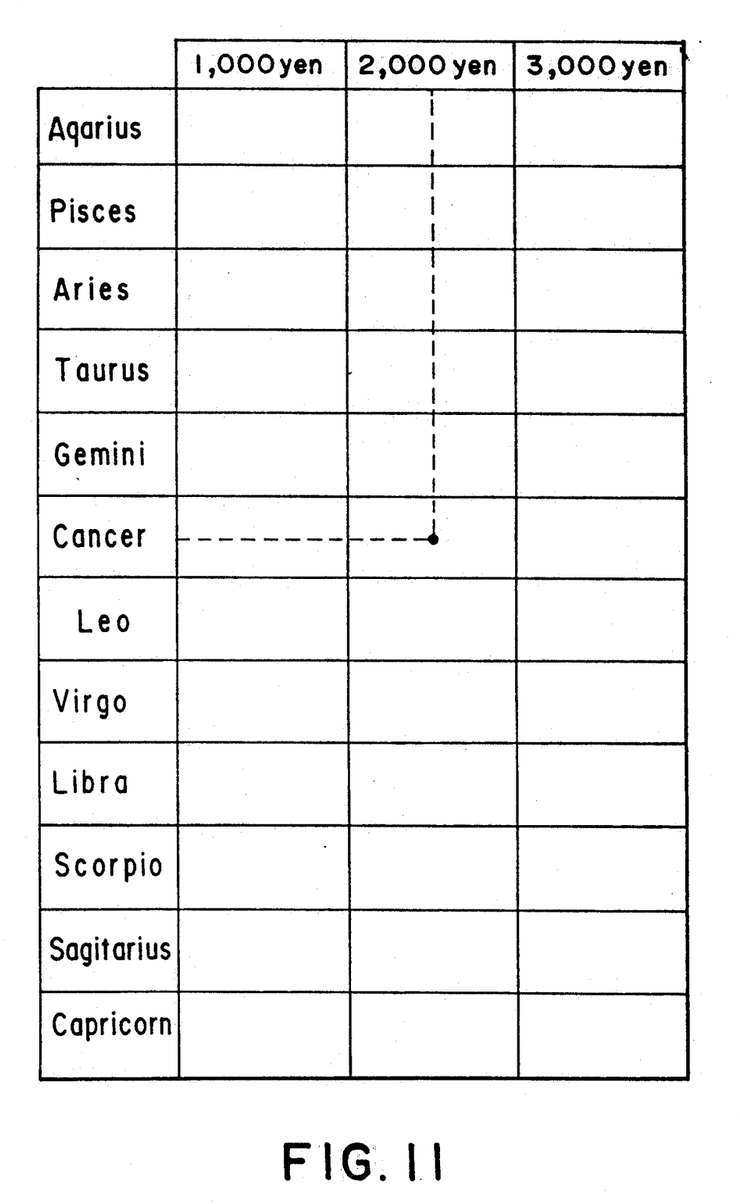
FIG. 11 is a schematic diagram illustrating the operation of the machine of FIG. 10.

The scheme by which a telephone card with horoscope information is issued is illustrated in FIG. 11, in which it will be seen that there are three selectable card values and twelve selectable birth signs, so that thirty-six possible cards can be issued, one corresponding to each empty rectangular box. In the example shown, the user has selected a card valued at 2000 Yen, and the constellation Cancer.

These kinds of vending machines can be used not only for telephone cards, but also for other articles such as juice or soft drink cans, and can print calendar information and other information on the articles prior to delivery by the vending machines.

Figure 12:
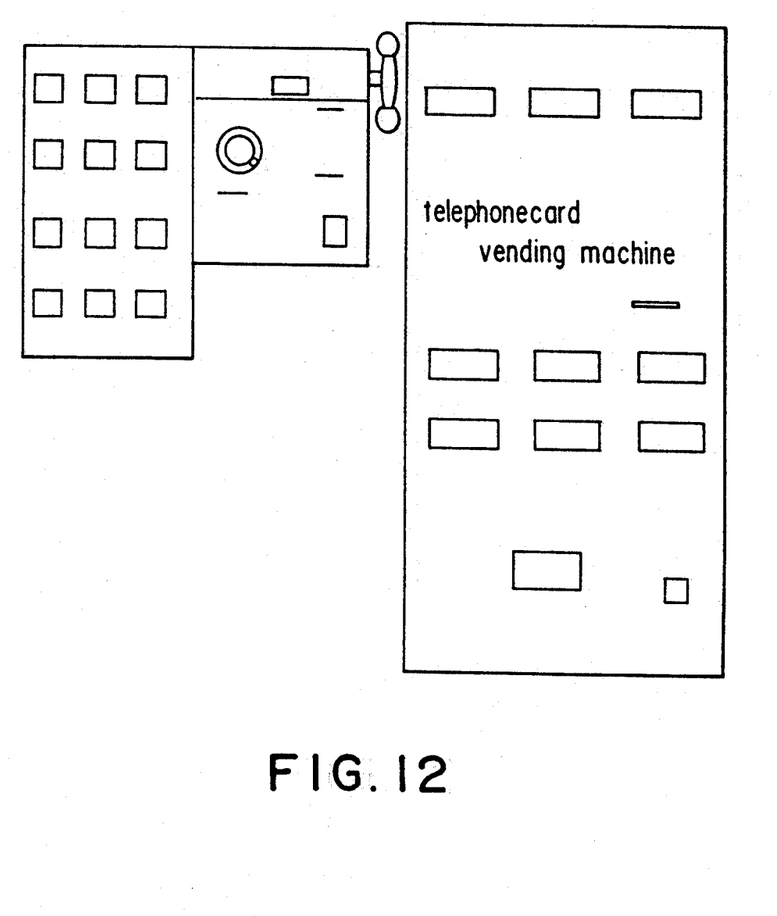
FIG. 12 is an elevational view showing a telephone card vending machine and a public telephone having a telephone card filing book adjacent to the telephone.

FIG. 12 shows a telephone card system comprising a telephone card vending machine, a public telephone, and, adjacent to the telephone, a telephone card file of the kind illustrated in greater detail in FIG. 2. When a telephone card is exhausted, the user can insert it into the card file. The availability of the card file adjacent to the public telephone reduces the problem of littering of exhausted telephone cards on the floor or ground in the vicinity of the telephone. The telephone card file exhibits the cards, and can be used as an ordinary calendar.

Figure 13:
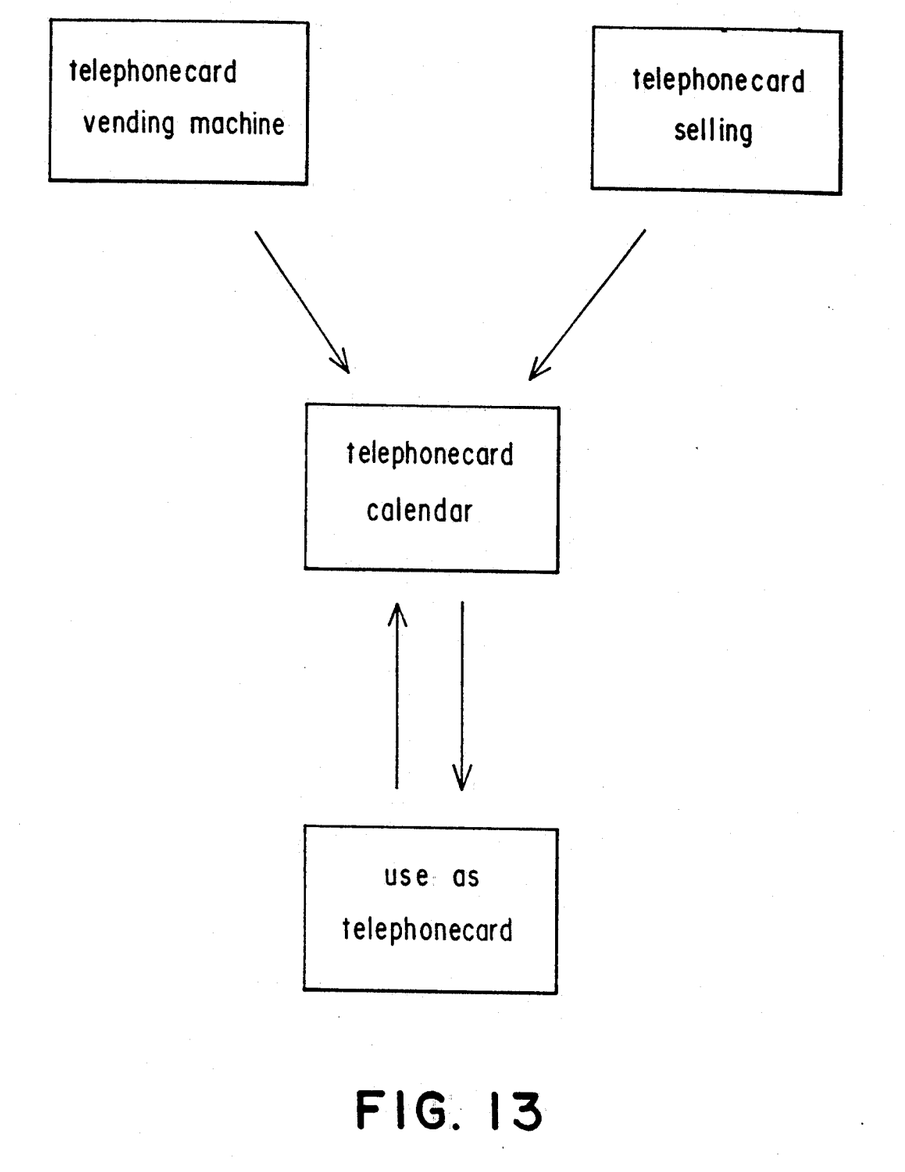
FIG. 13 is a schematic diagram showing how a telephone card in accordance with the invention is issued and used.

FIG. 13 shows a telephone card utilizing system in schematic form. As shown, the telephone card can be vended by an automatic telephone card vending machine or sold manually by an individual. It is immediately usable as a calendar, and can be used as a calendar both before and after its use as a telephone card.

Figure 14:
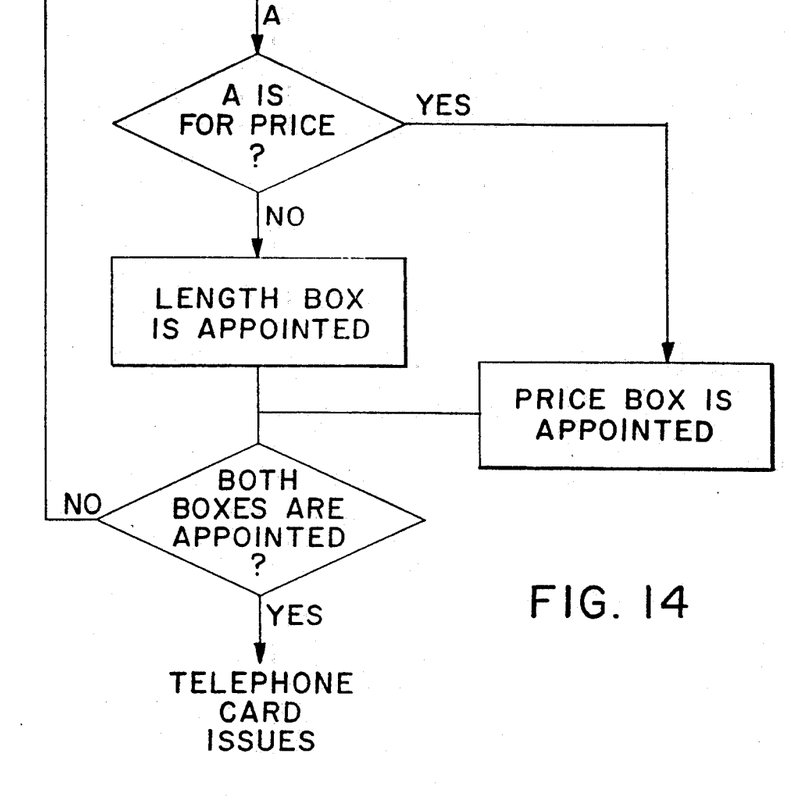
FIG. 14 is a schematic flow chart illustrating the operation of a telephone card vending machine in accordance with the invention.

In the flow diagram of FIG. 14, which illustrates the operation of a typical telephone card vending machine of the kind shown in FIG. 9, a determination is made as to whether both a price and a calendar period have been selected from the available choices presented to the customer by the vending machine. If both a price and a calendar period have been selected, (and of course an appropriate amount of currency has been inserted into the machine), a telephone card corresponding to the selections made will issue to the customer.

In the vending machine, of course, a cancellation button (not shown) can be provided for manual cancellation of the transaction. In addition, internal circuitry can be provided to effect cancellation of all selections already made in a transaction, and resetting of the vending machine, if, after the entry of a selection other than a final selection, no further selection is entered within a predetermined time interval. For example, the circuitry can be made to cancel the transaction if, no calendar period is entered within ten seconds after a monetary amount is entered.

Figure 15:
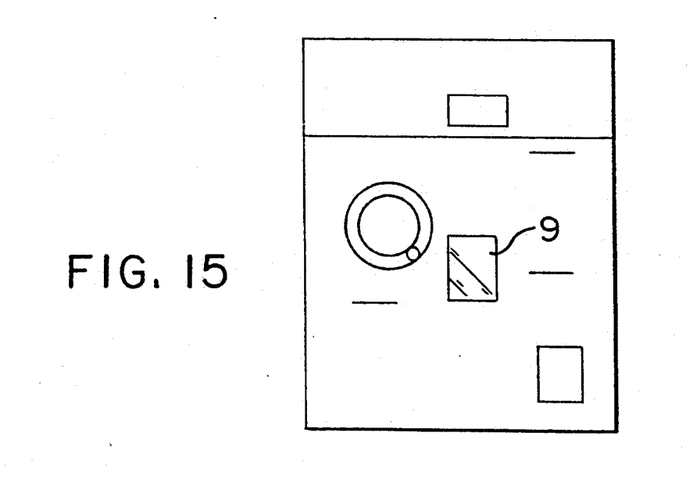
FIG. 15 is an elevational view of a public telephone in accordance with the invention, having a window for displaying the calendar information carried by the telephone card to the user while the card is located in the receiving and reading device on the telephone apparatus.

In FIG. 15, the public telephone is provided with a transparent window 9 through which the telephone card inserted into the card reader of the telephone apparatus can be viewed by the user. This makes it possible for the customer to refer to the calendar information on the telephone card while conducting a telephone conversation.

Figure 16:
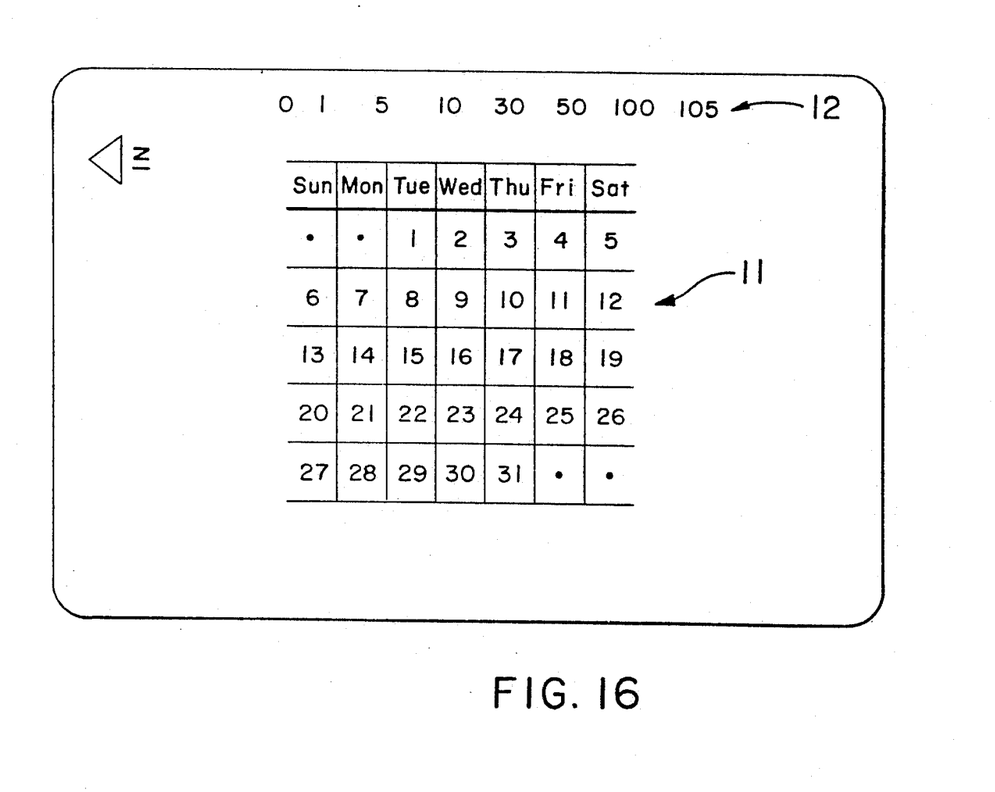
FIG. 16 is an elevational view showing still another embodiment of a telephone card in accordance with the invention.

In the telephone card of FIG. 16, the telephone card carries a continuous portion 11 of a calendar as well as a row 12 of numbers which can be automatically punched by the telephone apparatus to indicate to the customer the value remaining on the card. The numbers in row 12 are oriented in the same direction as the calendar information so that the numbers and the calendar information can be read easily by the user without rotating the card.

Figure 17:
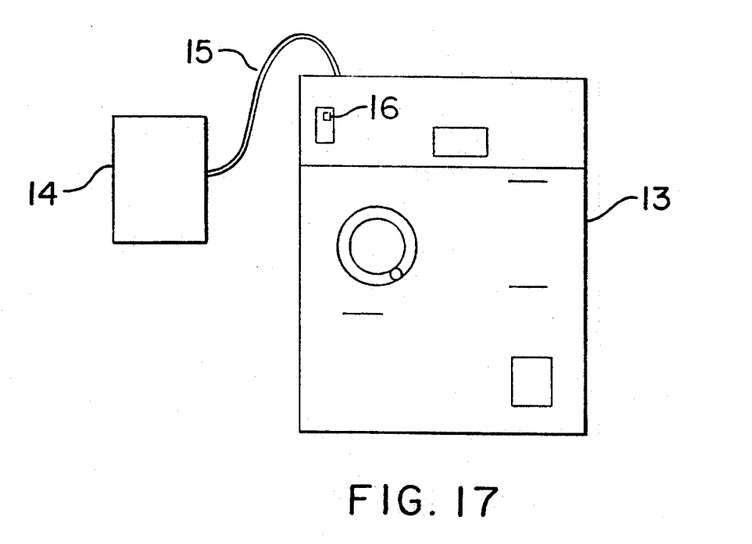
FIG. 17 is an elevational view showing a public telephone with a video display in accordance with still another embodiment of the invention.

In FIG. 17, a public telephone apparatus 13 is provided with a separate video display screen connected to it through a cable 15. Information recorded on the telephone card used to activate the telephone is displayed on the screen. The displayed information can include not only information concerning the monetary value remaining on the card, but also calendar information, and other information such as horoscope information, which can be recorded on the card magnetically for display on the video screen. A switch 16 is provided on the telephone apparatus to enable the user to activate and deactivate the video screen.

Various modifications can be made to the telephone card system described herein. For example while several versions of the vending machine have been described in which selections can be entered from two groups of choices, it is possible to provide for selection from three or more groups of choices before the card is issued. Choices from the different groups can be selected through a single set of buttons rather than through different sets of buttons as in FIGS. 9 and 10, by providing switching circuitry allowing the same buttons to perform two or more different functions, and providing visual indications of the available selections through a liquid crystal screen, a cathode ray tube, or a similar display device. The vending apparatus can issue preprinted telephone cards, or alternatively, it can include a printer for printing calendar information and other information on the card immediately prior to issuance. On the telephone card itself, the calendar information, and other information as well, can be printed on both sides rather than only on one side.

Other modifications, which will occur to those skilled in the art, can be made without departing from the scope of the invention as defined in the following claims.

I claim:

1. A telephone card system comprising a card having:

means on the card for recording machine-readable information to indicate a monetary value for the card, said recording means being machine-modifiable for deduction of monetary amounts from said monetary value;

pointing means printed on said card for indicating the direction of insertion of the card into card reading means associated with a public telephone; and means providing a visual display of human-readable continuous portion of a calendar on said card when inserted in the card reading means, the direction from the bottom to the top of said continuous portion being the same as the direction of said pointing means;

whereby, the card has continuing utility to the user as a calendar both during and after the time it is useful for operation of a public telephone;

said card including additional printed information thereon specific to both a selected time period and said continuous portion of a calendar and having human-readable information printed thereon for indicating the monetary value remaining in the card, said human-readable information and said additional printed information both being oriented in the same direction as said human-readable continuous portion of a calendar, whereby the calendar information, said human-readable information and said additional information can all be read easily without rotating the card.

2. A telephone card system according to claim 1 including machine vending means for delivering a telephone card to a customer, said vending means comprising means for entering a selection of a particular length of a continuous calendar period from a group of different choices, and means responsive to the entry of a selection in said entering means for effecting delivery to a customer of a telephone card having printed thereon a continuous portion of a calendar corresponding to the period entered in said means for entering a selection.

3. A telephone card system according to claim 1 including machine vending means for delivering a telephone card to a customer, said vending means comprising means for entering a selection of a particular time period, and means responsive to the entry of said particular time period in said entering means for effecting delivery to a customer of a telephone card having printed thereon information specific to said particular time period.

4. A telephone card system comprising a card having:

means on the card for recording machine-readable information to indicate a monetary value for the card, said recording means being machine-modifiable for deduction of monetary amounts from said monetary value;

pointing means printed on said card for indicating the direction of insertion of the card into card reading means associated with a public telephone; and means providing a visual display of a human-readable continuous portion of a calendar on said card when inserted in the card reading means, the direction from the bottom to the top of said continuous portion being the same as the direction of said pointing means;

whereby, the card has continuing utility to the user as a calendar both during and after the time it is useful for operation of a public telephone;

said telephone card system including machine vending means for delivering said telephone card to a customer, said vending means comprising:

means for entering selections from each group of plural groups of choices; and means, responsive to the entry of selections from all of said groups of choices, for effecting delivery to a customer of said telephone card.

5. A telephone card system according to claim 4 including machine vending means for delivering said telephone card to a customer, said vending means comprising:

means for entering a first selection from a first group of different choices;

means for entering a second selection from a second group of different choices; and means, responsive to the entry of selections from both of said first and second groups of different choices, for effecting delivery to a customer of said telephone card.

6. A telephone card system according to claim 5 including means for effecting cancellation of a selection in at least one of said first and second groups of different choices.

7. A telephone card system according to claim 5 including means for effecting cancellation of a selection in said first group of different choices when an entry of a second selection from said second group of different choices is not made within a predetermined time interval following entry of said first selection.

8. A telephone card system according to claim 7 in which said first group of different choices comprises a group of different prices for telephone cards, and in which said second group of different choices comprises a group of different lengths for a continuous calendar period.

9. A telephone card system according to claim 7 in which said first group of different choices comprises a group of different prices for telephone cards, and in which said second group of different choices comprises a group of specific calendar dates.

10. A telephone card system according to claim 4 including means for effecting cancellation of a selection in at least one of said plural groups of choices.

11. A telephone card system according to claim 4 including means for effecting cancellation of selections previously entered if, after the entry of a selection other than a selection completing the selections in all of said plural groups, no further selection is entered within a predetermined time interval.

12. A telephone card system according to claim 2, said vending means comprising means for printing a selected continuous calendar period on the telephone card.

13. A telephone card system including a public telephone having means for receiving said telephone card and for reading the machine-readable information on said telephone card, and means providing a video display for exhibiting, to the telephone customer, machine readable information recorded on said card after said card is inserted into said receiving and reading means, said system comprising a card having:

means on the card for recording machine-readable information to indicate a monetary value for the card, said recording means being machine-modifiable for deduction of monetary amounts from said monetary value;

pointing means printed on said card for indicating the direction of insertion of the card into card reading means associated with a public telephone; and means providing a visual display of a human-readable continuous portion of a calendar on said card when inserted in the card reading means, the direction from the bottom to the top of said continuous portion being the same as the direction of said pointing means;

whereby, the card has continuing utility to the user as a calendar both during and after the time it is useful for operation of a public telephone said system including a public telephone having:

means for receiving said telephone card and for reading the machine-readable information on said telephone card, and means providing a video display for exhibiting, to the telephone customer, machine readable information recorded on said card after said card is inserted into said receiving and reading means wherein said telephone card receiving means and said video display means are discrete and separate from each other.

14. A telephone card system according to claim 13 in which said public telephone includes switch means for activating and deactivating said video display.

* * * * *